Aug. 2, 1966 L. S. HILINSKI 3,263,976
APPARATUS FOR DISTRIBUTING LIQUID IN PACKED TOWERS
Filed April 9, 1964 2 Sheets-Sheet 1

— INVENTOR
LEO S. HILINSKI

BY *Kenneth E Prince*

ATTORNEY

United States Patent Office 3,263,976
Patented August 2, 1966

3,263,976
APPARATUS FOR DISTRIBUTING LIQUID
IN PACKED TOWERS
Leo S. Hilinski, Plainview, Tex., assignor to W. R. Grace & Co., a corporation of Connecticut
Filed Apr. 9, 1964, Ser. No. 358,485
4 Claims. (Cl. 261—98)

This invention relates to a new apparatus. More particularly it relates to a new bucket-type apparatus for distributing liquid in packed towers.

In summary this invention is directed to an apparatus for distributing liquid in packed towers used in gas absorption and in the actification, or regeneration of spent, or used, scrubbing liquid, or liquor. The apparatus comprises a bucket filled to about one-half its depth with packing positioned within a packed column, above said column's packing, with said bucket in liquid communication with a liquid feed line; said bucket having a closed bottom with at least one orifice at least about 0.4 inch in diameter located in said bottom, an open top in liquid communication with a liquid feed line, means for feeding liquid into said bucket, and a plurality of orifices, each at least about 0.4 inch in diameter, so positioned in the side walls of said bucket as to provide spaced-apart flow with the streams of flow substantially equidistant from each other.

Preferred embodiments of this invention include; (a) constructing the bucket-type distributor apparatus in the form of a hollow right circular cylinder; (b) having the height of said cylinder about equal to its diameter; (c) locating the wall orifices in the lower section (i.e., below the midpoint) of the bucket's wall; (d) arranging said orifices in two staggered horizontal rows, one row above the other, with at least 3 orifices in each row; (e) enclosing the bucket's packing in a wire basket made of about 2 mesh, U.S. standard, screen; (f) supporting said wire basket with rods attached to the inner surface of said bucket, thereby providing a clearance of about ¼ inch between said basket and said surface; (g) using Pall rings as packing in said bucket; (h) having said Pall rings about one inch in diameter; and (i) using the bucket of this invention to distribute scrubbing liquid, or liquor, in packed towers of the liquid-vapor contact type used in gas absorption and in the actification, or regeneration, of spent scrubbing liquor.

Figure 1:
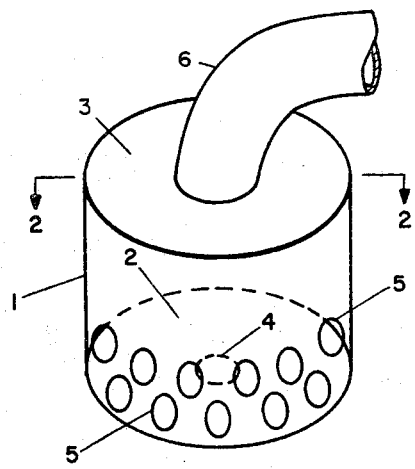
Figure 2:
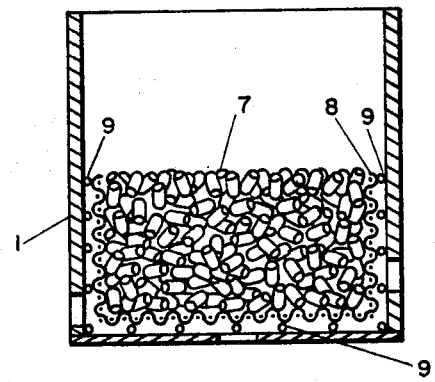
Figure 3:
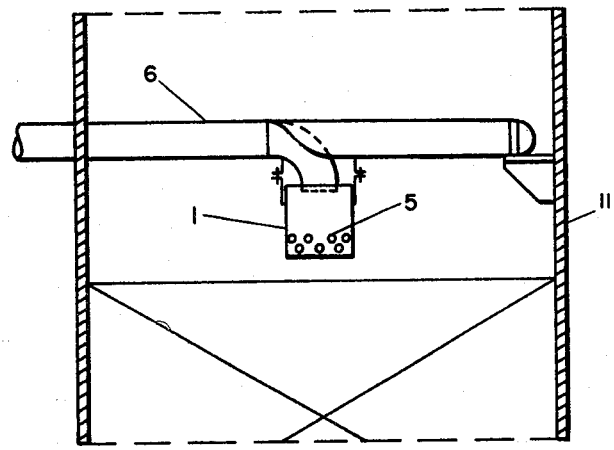
Figure 4:
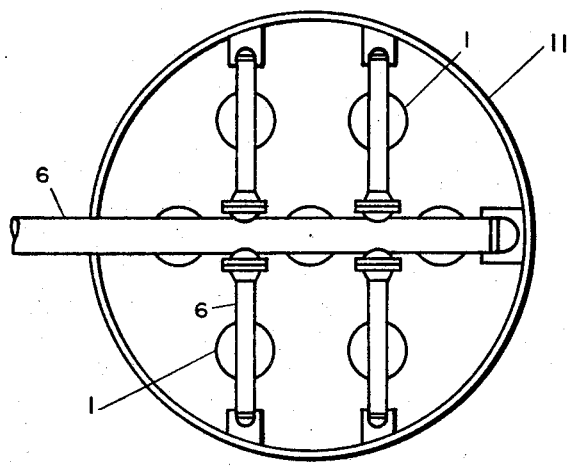

FIG. 1 is a perspective view of the bucket distributor of this invention, omitting its wire basket and packing. FIG. 2 is a sectional view taken along the line 2—2 of FIG. 1, showing packing and wire basket. FIG. 3 is a sectional view in elevation of a packed column with the bucket distributor of FIG. 1 positioned for operation. FIG. 4 is a plan view showing a plurality of buckets positioned for operation in a packed column.

Gas absorption comprises the transfer of a component (or components) of gaseous mixtures from said gaseous mixtures into solution in scrubbing liquors in which the dissolved gaseous component is soluble, thereby obtaining a gaseous phase and a dissolve phase. Such processes are used to separate the soluble component of gaseous mixtures from at least one substantially, or relatively, insoluble component of said mixtures. Usually, but not necessarily, the soluble component does not exceed 10-15% (frequently 10% and often 5%) by volume of the gaseous mixture under treatment. Gas absorption can be conducted at pressures ranging from less than one atmosphere absolute (e.g., 0.30-0.5 atmosphere) up to pressures of several hundred atmospheres. In general, the solubility of both the soluble and substantially insoluble gaseous components in any given scrubbing liquor increases as pressure is increased. Hence, for any given system there is a practical pressure limitation above which it is not economically practical to operate. Likewise, since the solubility of the soluble components decreases substantially as the pressure is decreased, there is a pressure, for each system, below which it is not economically practical to operate.

Regeneration, or actification, of used scrubbing solutions comprises removing a substantial portion of the dissolved gaseous components from said solutions, thereby rendering regenerated, or actified, liquor suitable for recycling to the gas absorption unit. Regeneration is seldom conducted under pressures greater than about 5–10 atmospheres absolute and is often conducted under pressures less than 1 atmosphere (e.g., 50–500 mm. of mercury absolute pressure).

Packed columns, or towers, are used extensively in gas absorption and in the regeneration, or activation, of used or spent, scrubbing solution, or liquor, which has been used in gas absorption. When conducting gas absorption in a packed column, the gaseous mixture is passed upward through said column, thereby bringing said mixture into contact with scrubbing solution which is passing downward through said column. The scrubbed gas exits the tower at the top and the spent liquor exits at the bottom of the tower. When regenerating spent scrubbing solution in a packed column, the spent liquor is passed downward over the packing where the dissolved gaseous components are removed by the application of heat, reduced pressure, contact with an upward moving current of steam or a gas substantially insoluble in said scrubbing solution, or by a combination thereof. This process removes a substantial portion of the dissolved components from the spent scrubbing solution, thereby actifying said solution. Obviously, actification, by the above-described method, can be used only in those instances where the dissolved gaseous components have a significant vapor pressure. For example, a spent solution of soda ash used to remove $H_2S$, $CO_2$, HCN, and mercaptans from coke-oven gas can be actified by the above-described method, because the $H_2S$, $CO_2$, HCN, and mercaptans dissolved in said soda ash solution possesses sigificant vapor pressures. On the other hand, a solution of silver nitrate used to remove acetylene from a gaseous mixture cannot be actified by the above-described method, because acetylene dissolved in said solution does not possess a significant vapor pressure.

The efficiency of a packed column for either gas absorption or the actification of spent scrubbing liquor is dependent to a substantial degree upon the efficiency with which the scrubbing liquor (or spent scrubbing liquor in the instance of activation) is distributed over the packing within said column. In other words, efficiency of the column depends to a substantial degree upon the extent to which the packing within the column is wetted. Various means have been used in the past for distributing liquor in packed towers; these include ring-type distributors, orifice tray-type distributors, notched riser tray distributors, notched trough distributors, and weir box distributors. All of these devices have serious faults or limitations. For example; (a) ring-type distributors require high pressure drops to assure equal flow of liquid through all distribution ports, and, since the minimum rate of liquid flow through devices of this type is about 50% of the maximum, flexibility of flow rate is strictly limited; (b) orifice tray distributors are not suitable for low flow rates, because the hydraulic gradient across the plate will cause uneven liquid distribution, and uneven liquid distribution can be caused by the hydraulic gradient produced when liquid is fed to the tray at a high velocity; (c) notched riser tray distributors are very susceptible to liquid entrainment, because both liquid and gas pass through the same openings in the distributor; (d) notched trough-type and weir box liquid distributors suffer from substantially the same defects as do orifice tray distributors, and the efficiency of distribution fluctuates with fluctuations in the rate that liquid is fed to such distributors.

It is an object of this invention to provide a simple apparatus for distributing scrubbing liquor in packed columns. It is another objective of this invention to provide an apparatus which will distribute scrubbing liquor substantially evenly over the packing. It is still another object of this invention to provide an efficient process for gas absorption and an efficient process for actifying used scrubbing solutions. Other objective will be apparent to those skilled in the art in view of the more detailed description which follows.

The apparatus of my invention is illustrated in FIG. 1. This apparatus comprises a bucket 1, filled to about one-half of its depth with packing of any known type (not shown) with a closed bottom 2, and an open top 3, at least one orifice, or discharge port, 4 in the bottom, a plurality of orifices, or discharge ports, 5 so positioned in the side walls of said bucket as to provide spaced-apart flow with streams of flow substantially equidistant from each other, and means 6 for feeding liquid into the bucket. By "bucket" is meant a hollow body including a hollow cylinder, hollow prism, hollow inverted cone, hollow inverted pyramid, hollow truncated cone, hollow truncated pyramid, or about half of a hollow sphere. Combinations of these hollow bodies are also included within the meaning of the term "bucket." For example, the bottom of a hollow cylinder may be replaced by a hollow inverted cone, or the bottom of a hollow prism may be replaced with a hollow inverted pyramid. Other combinations will be apparent to those skilled in the art. When using cylindrical buckets, I have found that hollow right cylinders are more convenient to use than other hollow cylinders, because it is somewhat easier to position said right cylinders in gas absorption towers. Nevertheless, hollow oblique cylinders perform equally satisfactorily if their deviation from the perpendicular is not so great as to interfere with the free flow of liquid exiting said cylinders via discharge ports in the cylinders' sides. I have also made similar observations with buckets made in other forms including hollow prisms, hollow cones, and hollow pyramids. Since the entrainment of liquid in gas (released when liquid entering the bucket contacts the packing in said bucket or the bucket's wall) is increased if the cross section area of the open top portion of said bucket is substantially less than the cross section area of any section cut through a lower portion of said body parallel to said open top, I have found that it is impractical to utilize substantially more than about one-half of a hollow sphere when constructing said bucket in about hemispherical form. For the same reason, a hollow truncated cone or a hollow truncated pyramid should be inverted when constructing said bucket in one of these shapes unless the angle of convergence is such that there is substantially no constriction to impede either the upward flow of gas within said bucket or the exit of said gas therefrom. Although it is obvious that the bucket of this invention cannot be constructed in the form of a trough or elongated manger, numerous other hollow forms and shapes suitable for use as buckets in the liquid distributor of my invention will be apparent to those skilled in the art.

While I generally prefer to construct my liquid distributor of carbon steel, I have found that it can be constructed of stainless steel, titanium, titanium clad steel, tantalum, silver, Monel, Inconel, quartz, glass, or ceramic material depending upon the corrosive properties of the system with which it will be in contact. Other materials of construction will be obvious to those skilled in the art.

Although packing of any known type can be used in the bucket of my liquid distributor, I prefer to use Pall rings. Pall rings of about 0.5–1.5 inch in diameter have been used with excellent results, but said rings of about 1 inch diameter are preferable. While the said Pall rings can be constructed of any suitable material (e.g., carbon steel, stainless steel, titanium, tantalum, silver, Monel, Inconel, quartz, glass, or ceramic material, and the like), I have found that carbon steel is a preferred material of construction unless its use is contraindicated by the corrosive nature of the gas-liquid system involved. The said Pall rings (or other packing) can be dumped into the bucket of my distributor; however, I prefer to package the packing in a wire basket made of about 2 mesh, U.S. standard, screen. The wire basket can be made of such materials as carbon steel, stainless steel, Monel, titanium, or silver depending upon the corrosive properties of the system involved. Other materials of construction will be obvious to those skilled in the art. The use of a wire basket to support the packing is illustrated in FIG. 2 which is a sectional view taken along line 2—2 of FIG. 1. The packing 7 is enclosed in a wire basket 8 which fits into bucket 1 wherein said basket 8 is supported by rods 9 attached to the inner surface of said bucket, thereby providing a clearance of about ¼ inch between the wire basket 8 and the inner surface of said bucket.

I have used the liquid distributor of my invention to distribute liquor over packing in towers ranging from about one foot in diameter to about 15 feet in diameter. In every instance I have obtained results far better than skill in the art, based on long experience with packed towers and methods of distributing liquor over the packing in said towers, had led me to expect. Among the advantages of the bucket-type liquid distributor of my invention are; (a) gas can be released from incoming liquor without the entrainment of liquid in the escaping gas; (b) velocity of the liquor fed to the tower's packing via the bucket-type distributor is dissipated, thereby preventing liquid gradient problems which are associated with other types of distributors; (c) the bucket-type distributor of my invention provides a higher percentage (ca. more than 85%) of free tower cross section than tray-type distributors, thereby substantially eliminating the entrainment of liquid in the gas exiting the tower, which is a serious problem with many liquid distributors; (d) pressure drop across the bucket-type distributor is very low; and (e) the discharge ports of the bucket distributor are large (e.g., preferably at least about 0.4 inch in diameter), thereby substantially eliminating plugging which is a serious problem with various other liquid distributors.

With towers of about 1.0–3.5 feet in diameter I prefer to use only one bucket-type distributor; with towers of about 3.6–9.0 feet in diameter I prefer to use 7 bucket-type distributors; and with towers above about 9.0 feet in diameter I prefer to use 19 bucket-type distributors. Preferred spacing arrangements of 1 and 7 bucket systems are illustrated in FIGS. 3 and 4, respectively, in which the distributors are shown at 1 and the tower wall at 11.

The apparatus of this invention can be used for distributing liquid in packed gas absorption towers, or columns, in any process wherein at least one component of a gaseous mixture is absorbed from said mixture by said liquid. Said apparatus can also be used for distributing liquor in packed towers, or columns, in any process in which spent, or used, scrubbing liquor from a gas absorption tower is actified (or regenerated).

Typical of uses for which the bucket distributor of this invention is especially useful are; (a) removing acidic gases (e.g., $CO_2$, $H_2S$, HCN, mercaptans, mixtures thereof, and the like) from impure streams of gas (e.g., impure $H_2$, $N_2$ CO, He, $O_2$, $CH_4$, or coke-oven gas, synthesis gas mixtures, and the like) by scrubbing with an alkaline solution (e.g., aqueous soda ash, aqueous potassium carbonate, aqueous monoethanolamine, aqueous diethanolamine aqueous triethanolamine, aqueous sodium phenolate, aqueous potassium phenolate, and the like); (b) removing acetylene from impure streams of gas (e.g., impure $CH_4$, $H_2$, $N_2$, He, $O_2$, or coke-oven gas, synthesis gas mixtures, and the like) by scrubbing with aqueous silver nitrate solution or with an aqueous solution of CuCl-KCl mixture; (c) removing olefins from gas streams (e.g., acetylene free coke-oven gas, olefin-containing synthesis gas mixtures, olefin-containing $H_2$, $CH_4$, and the like) by scrubbing with aqueous silver nitrate solution; and (d) actifying or regenerating spent scrubbing solutions from uses such as most of those described above. (Obviously, silver nitrate or CuCl-KCl solutions which have been used to absorb acetylene cannot be regenerated, or actified, by the usual methods, because the acetylene present in said solutions does not have a significant vapor pressure.) Regeneration may be accomplished by a number of procedures; among these are; (a) passing the used, or spent, scrubbing solution, which can be heated (e.g., to ca. 60–105° C. to 80–100° C. or even to 90–104° C.) downward through a packed column, or tower, while passing steam at about 110–165° C. upward through said column; (b) passing the spent liquor, which can be heated (e.g., ca. 60–105° C.), downward through a packed column while applying reduced pressure to said column; (c) passing the spent liquor, which can be heated (e.g., to ca. 60–105° C.), downward through a packed column while passing a gas of low solubility in said liquor, upward through said column; and (d) all possible combinations of steps (a) to (c). Still other procedures for actifying spent liquor will be obvious to those skilled in the art. The fact that numerous gas systems other than those listed above can be subjected to gas absorption processes using the bucket-type distributors of this invention will be obvious to those skilled in the art. It will also be obvious that many spent scrubbing solutions other than those listed above can be actified by processes using the bucket-type distributors of this invention. It will also be obvious to those skilled in the art that gases removed from spent scrubbing liquor can be discarded or recovered depending upon the economics of each individual situation.

The use of the bucket distributor of this invention is illustrated by the following examples which are illustrative only and which are not intended to limit the scope of the invention.

*Example I*

In the purification of ammonia synthesis gas for use in production of ammonia, a stream of crude, or impure, synthesis gas analyzing about 3–4% $CO_2$ impurity and about 71% $H_2$, 0.3% CO, 23.5% $N_2$, 0.3% Ar, 0.3% $CH_4$, and 1% $H_2O$ (where the percentages are expressed as percent by volume) passes upward through a packed absorption column, or tower, in flow counter-current to that of an aqueous solution of monoethanolamine (MEA) which passes downward through said column, thereby absorbing most of the $CO_2$. Treated gas from the top of the absorber must be low in entrained MEA and residual $CO_2$, since both are very undesirable in processing steps downstream. The MEA solution leaving the bottom of the absorption column is rich in $CO_2$. This solution is heated and passed into the top of a packed regeneration, or actification, tower, or column in which most of the absorbent $CO_2$ is removed by diffusion into a rising stream of steam. When distribution of the liquor within the absorption column is poor, absorption of $CO_2$ is incomplete, and when distribution of liquor within the actification column is poor, steam consumption is high and the $CO_2$ content of the regenerated MEA solution leaving the base of said column is high.

Originally, the MEA distributor in the absorption column consisted of a weir box constructed in the form of a cross. Each arm of the cross was 20 inches long, 8 inches wide, one foot deep, and open at the top. Along the upper edges of each side of each arm of the cross, seven 60° V-notches 3 inches deep were cut. Liquid entered the center of the cross through a feed pipe, then overflowed through the V-notch weirs onto the tower packing. Performance data for the MEA absorber when using the cross weir box distributor are shown in the first column of Table 1.

Although the cross weir box permitted operation of the ammonia plant, its performance was disappointing, because the residual $CO_2$ content of the exit gas was still higher than desired. A bucket distributor system was designed and installed. The system consisted of 7 buckets (right circular cylinders), each 12 inches deep by 8 inches in diameter, with 12 holes $^{11}\!/_{16}$ inches diameter near the bottom, and one ½ inch hole in the center of the bottom. Each bucket contained a 4 inch deep bed of 1 inch Pall rings, retained by a wire mesh basket. Performance data for the MEA absorber with the bucket distributor system are presented in the second column of Table 1. It is noteworthy that with the bucket distributor system installed, residual $CO_2$ in the exit gas dropped to 112 p.p.m. by volume (vs. 636 p.p.m. by volume obtained with the weir).

The MEA distributor originally used in the regeneration column consisted of a cross-shaped weir box identical to the one used in the absorber. Steam consumption per pound of $CO_2$ removed on a typical day was 3.55. When a bucket-type distributor identical with the one used in the absorber was installed, steam consumption on a typical day at design capacity dropped to 3.26 pounds per pound of $CO_2$, a saving in steam of almost 10%. In addition, the MEA was stripped to a lower $CO_2$ content (1.00% by weight with the bucket distributors vs. 1.73% by weight with the weir type distributor). The lower $CO_2$ content of regenerated MEA was a factor contributing to the improved efficiency of the absorber cited above. Data presented in Table 2 compare the performance of the actification tower with weir-type and bucket-type distributors. These data also show that the actified MEA solution contained only 0.73 standard cubic feet of $CO_2$ per gallon (s.c.f./gal.) when the bucket-type distributors were used in the actification column vs. 1.26 s.c.f./gal. obtained when using a weir-type distributor.

The improved operating efficiency and the greatly lowered $CO_2$ content of the synthesis gas obtained in the above-described synthesis gas purification system by replacing weir-type distributors in both the absorption and actification units with the bucket-type distributors of this invention were highly gratifying, surprising, and completely unobvious.

TABLE 1.—PERFORMANCE OF MEA ABSORBER

| Distributor, Type | Cross Weir Box | Bucket |
|---|---|---|
| Tower Diameter, I.D | 5′–6″ | 5′–6″ |
| Packed Height | 36′ | 36′ |
| Packing, Porcelain Raschig Rings | 1″x1″ | 1″x1″ |
| Pressure (Top), p.s.i.g | 100 | 100 |
| Temperature (Top*), ° C | 45 | 41 |
| Liquid Flow, gal./min | 245 | 237 |
| Liquid Density, lbs./ft.³ | 63.3 | 62.9 |
| Liquid Feed: | | |
| $CO_2$ lbs./hour | 2,151 | 1,196 |
| MEA, lbs./hour | 22,273 | 17,687 |
| $H_2O$, lbs./hour | 99,936 | 100,707 |
| Gas Flow, lbs./hour | 20,600 | 19,740 |
| Gas Density, lbs./ft.³ | 0.163 | 0.166 |
| Composition of Gas Leaving Top of Absorber, Vol. Percent: | | |
| $H_2$ | 73.6 | 73.6 |
| CO | 0.3 | 0.3 |
| $N_2$ | 24.5 | 24.5 |
| Ar | 0.3 | 0.3 |
| $CH_4$ | 0.3 | 0.3 |
| $H_2O$ | 1.0 | 1.0 |
| | 100.0 | 100.0 |
| $CO_2$ Absorbed, lbs./hour | 3,665 | 3,892 |
| Residual $CO_2$ in Gas, p.p.m. (by Volume) | 636 | 112 |

*Temperature of MEA solution entering the top of the tower and temperature of gas leaving the top of the tower.

TABLE 2.—PERFORMANCE OF MEA REGENERATOR

| Distributor, Type | Cross Weir Box | Bucket |
|---|---|---|
| Tower Diameter, I.D | 5'-5⅜" | 5'-5¾" |
| Packed Height | 36' | 36' |
| Packing, Procelain Raschig Rings | 1" x 1" | 1" x 1" |
| Pressure (Top), p.s.i.g | 19 | 19 |
| Temperature (Top*), °C | 103 | 102 |
| Liquid Flow, gal./min | 245 | 237 |
| Liquid Density, lbs./ft.³ | 63.1 | 62.7 |
| Liquid Feed: | | |
| $CO_2$, lbs./hour | 5,716 | 5,088 |
| MEA, lbs./hour | 22,273 | 17,687 |
| $H_2O$, lbs./hour | 99,936 | 100,707 |
| Gas Flow, lbs./hour | 8,665 | 9,192 |
| Composition of Gas Leaving Top of Regenerator, Vol. Percent: | | |
| $CO_2$ | 23 | 23 |
| $H_2O$ | 77 | 77 |
| $CO_2$ Removed, lbs./hour | 3,665 | 3,892 |
| Steam to Reboiler, lbs./hour | 13,000 | 12,700 |
| Ratio, lbs. Steam: lb. $CO_2$ | 3.55 | 3.26 |
| $CO_2$ Content of Regenerated MEA s.c.f. $CO_2$/gal. MEA Solution | 1.26 | 0.73 |

*Temperature of the MEA solution entering top of the tower and of the gas leaving the top of the tower. During these runs steam entered the bottom of the tower at about 143° C. and MEA solution left the bottom of the tower at about 125° C.

*Example II*

The absorption and actification runs (with bucket distributors) described in Example I were repeated, but in this instance steam entering the bottom of the actification tower had a temperature of about 150° C. The results obtained were substantially the same as those obtained in Example I.

Similar runs were made with steam temperatures (i.e., the steam entering the bottom of teh actifier) at temperatures of about 120–165° C. and about 135–150° C. with results substantially the same as those obtained in Example I.

What is claimed is:
1. Apparatus for distributing liquid in a packed tower comprising at least one bucket, filled to about one-half its depth with packing, positioned within said tower, above said tower's packing, with the number of buckets in a tower determined by the following schedule based upon tower diameter;

| Tower diameter, feet: | Number of buckets |
|---|---|
| 1.0–3.5 | 1 |
| 3.6–9.0 | 7 |
| Above 9.0 | 19 | each bucket; (a) having an open top in liquid communication with a liquid feed line; (b) having a closed bottom with at least one orifice about 0.4 inch in diameter positioned therein; and (c) having a plurality of orifices, each at least about 0.4 inch in diameter positioned in the bucket's side wall below the midpoint of said wall and so positioned as to provide spaced-apart flow with the streams of flow being substantially equidistant from each other.

2. The apparatus of claim 1 in which the orifices in each bucket's side walls are arranged in two staggered horizontal rows, one row above the other, with at least 3 orifices in each row.

3. The apparatus of claim 1 in which the packing within each bucket is enclosed in a wire basket made of about 2 mesh U.S. standard screen with said basket being supported by rods attached to the inner surface of said bucket, whereby a clearance of about ¼ inch is provided between said basket and said inner surface.

4. The apparatus of claim 1 in which the packing consists of Pall rings having a diameter of about one inch.

References Cited by the Examiner
UNITED STATES PATENTS

| 2,125,343 | 8/1938 | Hochschwender et al. __ 261—97 |
| 2,546,479 | 3/1951 | Sodano _____ 261—95 X |
| 2,995,204 | 8/1961 | Prostshakov _____ 55—474 X |
| 3,005,679 | 10/1961 | Yerzley. |
| 3,006,623 | 10/1961 | Ross et al. _____ 261—97 X |
| 3,050,919 | 8/1962 | Tailor _____ 55—233 X |
| 3,112,256 | 11/1963 | Young et al. _____ 55—83 X |
| 3,158,171 | 11/1964 | Eckert _____ 261—95 X |

REUBEN FRIEDMAN, *Primary Examiner.*

J. ADEE, *Assistant Examiner.*